Sept. 16, 1969        J. S. CONNER        3,467,013
SUBMARINE FLUID TRANSMISSION SYSTEM AND CONDUIT THEREFOR
Filed May 14, 1965        2 Sheets-Sheet 1
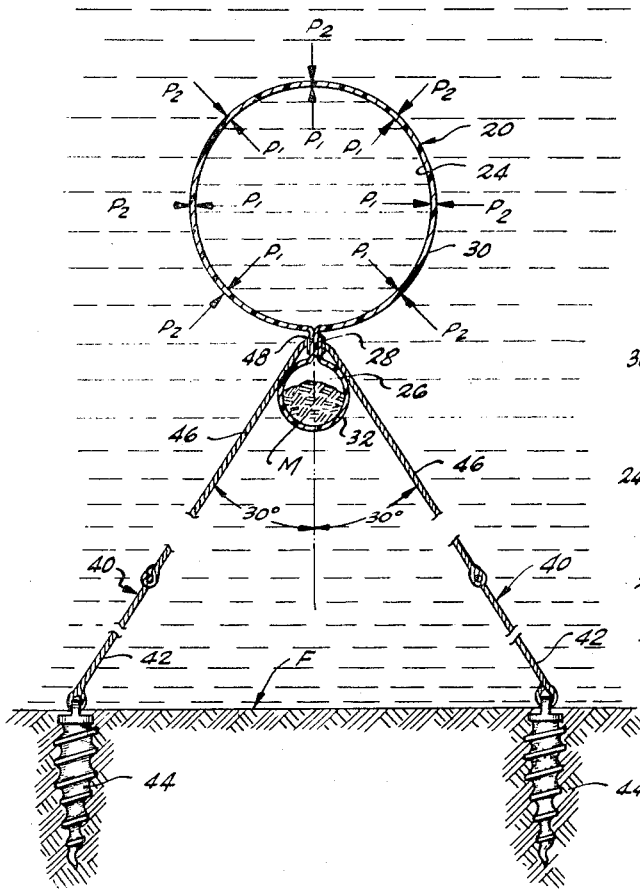
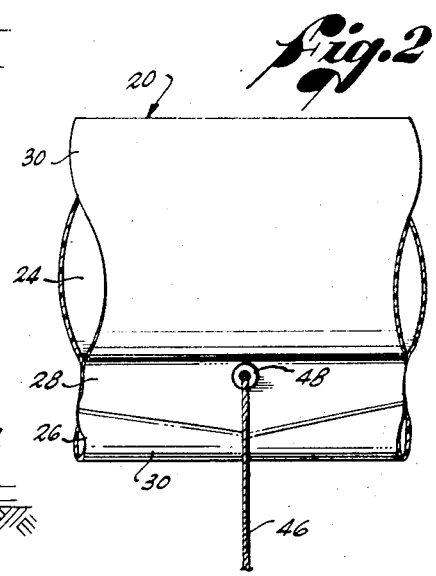
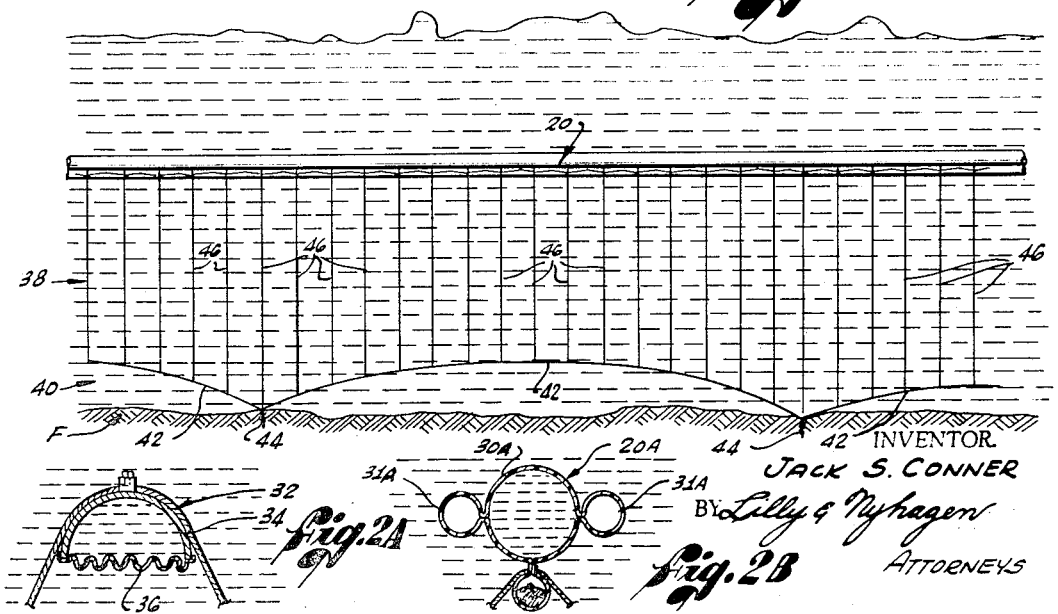
INVENTOR.
JACK S. CONNER
BY Lilly & Nyhagen
ATTORNEYS Sept. 16, 1969   J. S. CONNER   3,467,013
SUBMARINE FLUID TRANSMISSION SYSTEM AND CONDUIT THEREFOR
Filed May 14, 1965   2 Sheets-Sheet 2
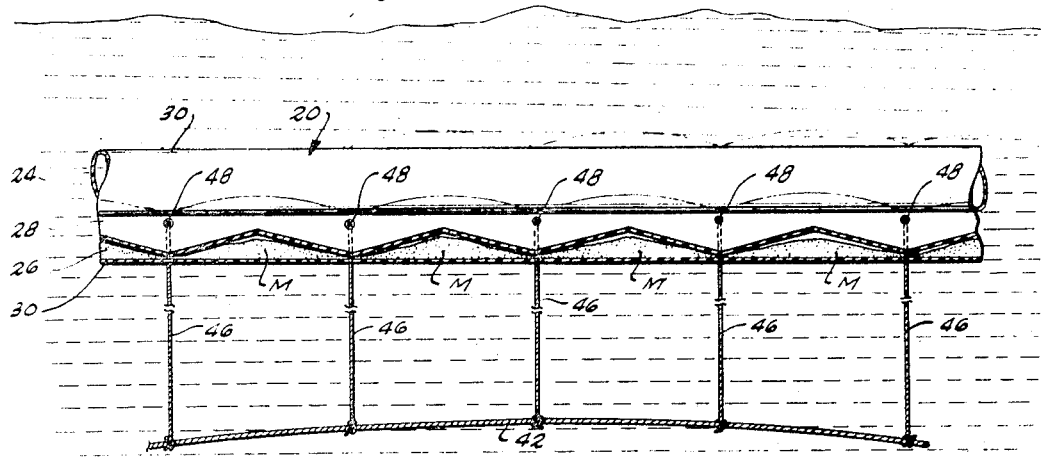
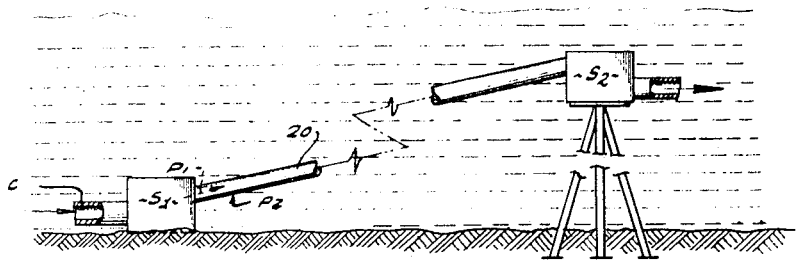
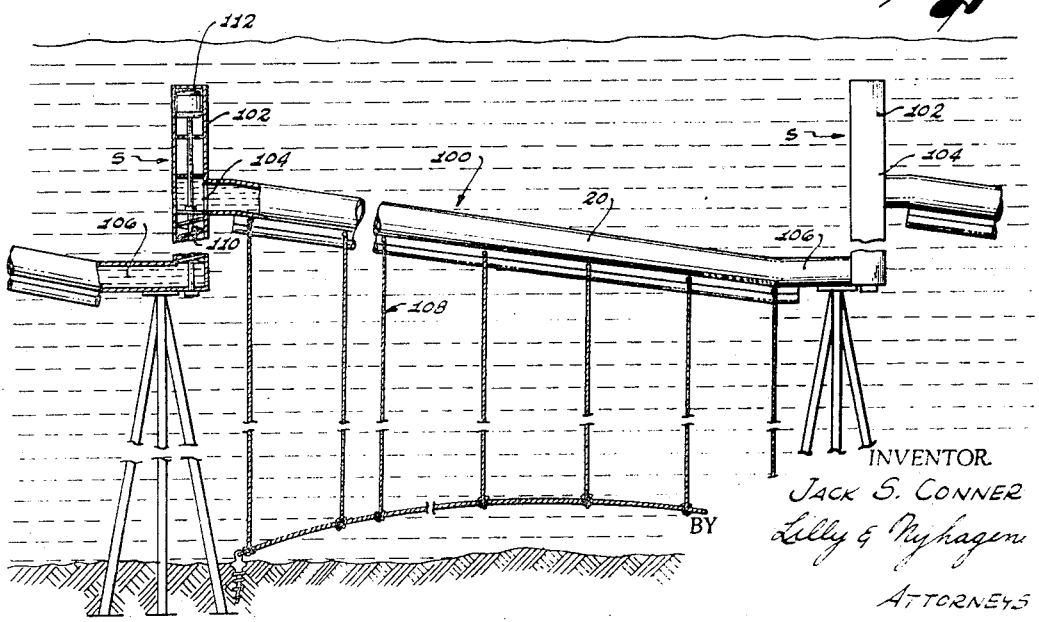
INVENTOR.
JACK S. CONNER
BY Lilly & Nyhagen
ATTORNEYS

3,467,013
SUBMARINE FLUID TRANSMISSION SYSTEM AND CONDUIT THEREFOR
Jack S. Conner, 10024 Genesta Ave., Northridge, Calif. 91324
Continuation-in-part of application Ser. No. 176,004, Feb. 27, 1962. This application May 14, 1965, Ser. No. 475,906
Int. Cl. F04b 23/04; B63b 35/02
U.S. Cl. 103—5                                     7 Claims The present application is a continuation-in-part of my copending application Ser. No. 176,004 filed Feb. 27, 1962, and now abandoned and entitled Submarine Fluid Transmission System and Conduit Therefor.

This invention relates generally to the transmission of fluids from one location to another and, particularly, to a submerged marine fluid transmission system.

In its broader aspects, the invention provides a novel fluid transmission system for transporting a liquid of given density through a body of water of greater density. However, the invention will be disclosed in connection with one particular application of the present fluid transmission system, namely, transporting or conveying fresh water between two distant geographical locations through an intervening body of sea water.

While in many areas of the world there exists a critical shortage of fresh water, other areas of the world possess overabundant supplies of fresh water. Generally speaking, these supplies exist between the north and south 25° latitudes and, again, between the north and south 55° latitudes and the poles. The rate of fresh water flow in the Columbia River in Oregon, for example, normally averages between 90,000 and 300,000 cubic feet per second and at flood stage over 1,000,000 cubic feet per second. Southern California, on the other hand, has a shortage of fresh water which becomes more critical each year due to the tremendous influx of people to this area. The mean flow rate of the Columbia River is on the order of 200,000 cubic feet per second, or 1,440,000,000 acre feet per year, which exceeds the present requirements of the southern California area by a factor of 5,000. Even northern California itself has an average fresh water supply, furnished by the Eel, Mad, and Van Dusen Rivers, of 38,000,000 acre feet per year, which is 14 times the present southern California requirements. Similar conditions exist in other parts of the world.

Clearly, then, the problem is not one of locating or producing the required supplies of fresh water, but, rather, one of transporting fresh water from the many natural, over-abundant supplies thereof to the areas in which critical water shortages exist. Various systems for transporting fresh water from areas of supply to areas of demand have, of course, been devised and are in present use, while other systems, such as the Feather River Project for supplying fresh water to southern California, are under consideration, development, or construction. These existing systems, however, are, in many cases, not completely satisfactory for various reasons, such as prohibitive cost, inability to supply the demand, construction difficulties and excessive power requirements due to geographical features, length of time required to complete the system, and so on. Moreover, aside from the present fluid transmission system, no practical systems whatsoever have been devised for transporting fresh water from many natural supplies to many areas of demand. Up to the present invention, for example, no practical system has been devised for transporting fresh water from the Columbia River, or from the rivers of northern California, mentioned earlier, to the southern California area. With regard to the Feather River Project, as well as other conceivable systems for transporting fresh water overland from northern supplies to southern California, for example, the following are some of the problems involved: The construction period for the Feather River Project is estimated at ten years, whereas the critical water shortage in southern California exists now. Acquisition of the right of way for a water conduit running overland, as contemplated in the Feather River Project, is complicated, costly, and very likely to involve political pressures. Further, in some areas, such as the Sacramento-San Joaquin River Delta involved in the Feather River Project, the available right of way is unsuited to supporting a water conduit. A land conduit leading to southern California from the north must pass over the Tehachapi Mountains, resulting in a tremendous electrical energy requirement for pumping. It has been estimated, for example, that to lift the 1,800,000 acre feet per year of fresh water, contemplated in the Feather River Project, over the Tehachapi Mountains alone, on a 12 hour off-load basis, will require 2,219,000 horsepower at 100 percent efficiency, which exceeds the total electrical energy generated by all of the hydroelectric generating stations in the State of California. Moreover, such an off-load basis of operation requires extensive reservoir systems at the top of the Tehachapi range. Another difficulty in an overland water transmission system is that the water conduit must possess a pressure vessel contruction capable of withstanding the high pressures involved in pumping the water overland. A conduit of this kind, of course, is costly, difficult and time consuming to manufacture, transport, handle and assemble, must be completely prefabricated at a location which is likely to be remote from the construction site, and requires extensive equipment and a large construction crew. Moreover, being exposed, the conduit is prone to accidental damage, vandalism and sabotage and is subject to damage or complete destruction, as well as radioactive contamination in the event of a nuclear war. While the preceding discussion relates to one particular area, namely, the West Coast of the United States, problems similar to those mentioned above, and, perhaps, other, more serious problems exist in connection with the overland transportation of fresh water in other parts of the world. Also, of course, the problems discussed are common to the overland transportation of fluids other than water.

The present invention provides a novel fluid transmission system which is particularly well suited for transporting fresh water between two geographical locations and which cures most, if not all, of the deficiencies inherent in the existing fluid transmission systems, particularly land based systems. To this end, the invention provides a submarine fluid transmission system comprising a conduit which extends submerged through a body of sea water and contains the fresh water being transported. According to one aspect of the invention, the conduit is submerged, at its inlet end, to a predetermined depth related to the pressure at which the fresh water is delivered to the conduit and is provided with an upward slope or gradient in the direction of fresh water flow therethrough, such that the external sea pressure on the conduit and the internal fresh water pressure in the conduit diminish in predetermined relation along the conduit. The depth of submergence of the inlet end and the upward gradient or route of the conduit may be selected to yield any desired ratio between the internal and external pressures at each point along the conduit and any desired hoop tension in the conduit wall. For example, the internal and external pressures may be approximately equalized along the entire conduit by proper selection of the conduit route, thus to provide minimal hoop tension along the conduit and permit the conduit wall to be constructed of a thin, pliable membrane. In this case, the membrane wall serves primarily as a simple barrier between the fresh water and the ambient sea water. Alternatively, a conduit route or gradient may be selected which will result in substantially greater internal fresh water pressure in the conduit than external sea pressure in the conduit, at each point along the conduit and, therefore in hoop tension in the conduit wall. Any desired hoop tension may be achieved by proper selection of the conduit route.

A second important aspect of the invention is concerned with a unique overall fluid transmission system for transporting a liquid, such as fresh water, long distance through sea water. This system comprises a number of spaced submerged pumping stations interconnected by fluid transmission conduits. Each conduit has an upward slope or gradient from the outlet of the adjacent pumping station to the inlet of the following station, which gradient is selected to yield, at each point along the respective conduit, a predetermined relation between the internal fresh water pressure in the conduit and the external sea pressure on the conduit.

According to a third important aspect of the invention, the upward gradient or route of each conduit of the present fluid transmission system is selected to yield a substantial balance between the internal and external pressures on the conduit, at each point along the conduit, so as to enable the conduit to be constructed of a lightweight material, such as a thin plastic membrane, whose total weight is less than the buoyant force of the liquid or fresh water being transported. Under these conditions, the conduit is buoyant in the normal operating condition of the fluid transmission system and must be anchored to the ocean floor. To this end, the invention provides a novel conduit anchoring means for the fluid transmission system and novel conduit weighting means which are effective to prevent undesirable upward arching or bowing of the conduit in the regions between the points of attachment of the conduit to the anchoring means under the upward buoyant force of the transported liquid or fresh water.

A unique and highly important feature or advantage of the thin membrane conduit or conduits employed in the present fluid transmission system resides in the fact that these conduits react freely to the external and internal pressures active thereon. As a consequence, the conduit walls constantly conform to the stream of liquid or fresh water being transported, or completely collapse when the transmission system is shut down. Accordingly, there is no necessity of providing the conduits with compressive strength capable of withstanding the ambient sea pressure, nor possibility of inward rupture of the conduits by the ambient sea pressure, when flow through the transmission system is reduced or entirely cut off.

A general object of the invention, then, is to provide a novel submarine fluid transmission system for transporting a liquid of given density through a body of water of greater density.

A related object of the invention is to provide a submarine fluid transmission system for transporting fresh water through a body of sea water.

Another object of the invention is to provide a submarine fluid transmission system of the character described having one or more fluid conduits which are submerged to a predetermined depth at their inlet ends and have an upward slope or gradient in the direction of flow through the conduits in such manner as to establish a predetermined ratio between the internal and external pressures on the conduit and a corresponding hoop tension in the conduit wall, at each point along the conduits.

A related object of the invention is to provide a submarine fluid transmission system according to the foregoing object wherein the internal and external pressures on the conduits are substantially balanced along the entire length of the conduits, thereby permitting the conduits to be constructed of a thin pliable, lightweight membrane which reacts freely to the internal and external pressures and conforms to the liquid stream within the conduits in such a way as to eliminate the necessity of providing the conduits with compressive strength for withstanding the external water pressure and the possibility of inward rupture of the conduits when liquid flow through the system is reduced or entirely cut off.

Another related object of the invention is to provide a submarine fluid transmission system of the character described wherein the lightweight fluid conduits are buoyant when filled with the relatively low density liquid being transported and are anchored and weighted in a novel manner which permits the conduits to conform accurately to a preselected optimum route between the surface of the floor of the body of water in which the conduits are submerged, whereby the conduits are not subject to damage by vessels on the surface of the water, objects or formations on the floor, vandalism, or sabotage and the cost of fabricating and installing the transmission system is minimized.

A further object of the invention is to provide a novel submarine fluid transmission system for transporting a liquid long distances through a body of water, which system embodies a number of sloping conduits and intervening pumping stations for discharging the liquid into the inlet ends of conduits at the proper pressure to attain predetermined ratio between the internal and external pressures at each point along the conduits.

Other objects, advantages, and features of the invention will become evident as the description proceeds.

Briefly, the objects of the invention are attained by providing a submarine fluid transmission system of the character described which utilizes the fact hereinafter demonstrated, that the static pressure or head of a liquid of relatively low density diminishes with an increase in elevation at a rate which is less than that at which the static pressure or head of a liquid of higher density diminishes. In the present fluid transmission system, then, the static head of the relatively low density liquid flowing through the system diminishes, in the upward direction of flow through each sloping conduit of the system at a rate which is less than the rate at which the static head of the ambient water diminished along the conduit. According to the present invention, the inlet end of each conduit is submerged to a depth at which it is necessary to produce the desired flow rate or slightly greater than the external water pressure on that end.

As hereinafter explained in greater detail, these relationships between the total head of the liquid entering each conduit and the external static head at the inlet end of the conduit and between the rates at which the internal and external static heads diminish along the conduit give rise to an excess internal pressure head (internal static head plus velocity head minus external static head) which increases along the conduit to a maximum at the upper end of the conduit.

In the present invention, the gradient of and friction loss within each conduit of the transmission system are related in such a way that the friction loss reduces the excess internal pressure head in the conduit just sufficiently to establish a predetermined ratio between internal and external pressures at each point along the conduit. For example, a conduit gradient or route may be selected which yields a substantial balance between internal and external pressures along the entire length of each conduit. In this case, the wall of each conduit may be constructed of a thin pliable, relatively lightweight membrane whose primary function is simply to separate the liquid within the conduit from the surrounding water. Such a conduit may be buoyant when filled with the liquid being transported. For this reason, the present invention provides a novel means for anchoring and weighting the conduits of the fluid transmission system in such a way that the system may follow an optimum route between the surface and floor of the body of water in which the system is submerged, where the internal and external pressures on the system conduits are substantially balanced and the conduits are protected against damage by surface vessels, bottom formations, sabotage and vandalism. Other advantages of such conduits are their relatively low cost of fabrication and installation and their immunity to inward rupture or crushing by external water pressure in the event the flow through the system is reduced or cut off. Alternatively, a conduit route of lesser gradient may be selected which results in only partial balance of the internal and external pressures and corresponding hoop tension in the conduit wall.

For transporting liquid over long distances, the invention provides a submarine fluid transmission system including a number of conduits constructed and arranged as described above and intervening pumping stations. Each pumping station receives the transported liquid from the upper outlet end of the preceding conduit and discharges the liquid into the lower inlet end of the following conduit at the proper pressure to attain the desired ratio between internal and external pressures along the following conduit.

The invention will now be described in greater detail by reference to the attached drawings.

In these drawings:

FIG. 1 is a vertical transverse section through one form of fluid conduit for use in the present submarine fluid transmission system and illustrating the conduit submerged in and tethered to the bottom of a body of water;

FIG. 2 is a side elevation of a portion of the conduit in FIG. 1;

FIG. 2A illustrates, on reduced scale, an alternative conduit configuration for use in the present fluid transmission system;

FIG. 2B illustrates a further alternative conduit configuration;

FIG. 3 is a side elevation, on reduced scale, of the conduit in FIG. 1 illustrating especially the means for tethering the conduit to the bottom;

FIG. 4 is a side elevation, partially broken away, and on reduced scale, of the conduit in FIG. 1 illustrating the manner of weighting the conduit to maintain the latter straight;

FIG. 5 illustrates one section of a fluid transmission system according to the invention including a pumping station and a conduit extending from the outlet of the pumping station, with an upward gradient in the direction of fluid flow through the conduit, thereby to attain a predetermined ratio between internal and external pressures and a predetermined hoop tension at each point along the conduit; and FIG. 6 illustrates an alternative submarine fluid transmission system according to the invention for transporting a fluid over long distances through a body of water such as the ocean.

Reference is made first to FIGS. 1 and 2 of these drawings in which the illustrated conduit for the present fluid transmission system is designated by the numeral 20. Conduit 20 has a generally uniform wall thickness throughout its length and consists of a thin, flexible membrane which may be constructed of linear polyethylene, polyvinyl chloride, rubber-coated cloth, rubber, rubber-coated nylon cloth, etc., which is shaped in cross section to form a normally upper, relatively large fluid passage 24, a lower, smaller, longitudinally extending chamber 26, and a longitudinal web 28 joining the wall 30 of the fluid passage 24 and the wall 32 of the chamber 26. The illustrated conduit could be conveniently fabricated, for example, by wrapping a flat, continuous web of suitable material about a form and sealing the overlapping edges to form a tube, and then sealing opposing inner surface portions of the tube to one another to form the web 28, passage 24, and chamber 26.

FIG. 2A illustrates an alternative conduit 32 comprising an inverted, U-shaped, relatively rigid wall portion 34 and a flexible, convoluted wall portion or membrane 36.

As noted earlier, the fluid conduit 20 or 32 is particularly useful in transporting fresh water or other relatively low density liquid between two points situated adjacent a body of water, such as an ocean, lake, river, canal, etc., and is submerged in the water, as shown in FIG. 1, for its entire length. Assume for the moment that the fluid flowing through the conduit, i.e., through conduit passage 24, exerts an internal pressure $P_1$ outwardly against the wall 30. Acting inwardly on the outside of the wall 30 is the external water pressure $P_2$, the magnitude of which is determined by the submerged depth of the conduit. Conduit 20, being a thin, flexible material or membrane, can freely react diametrically in response to these internal and external pressures.

Thus, consider an incremental length of conduit with liquid flowing through the conduit at a given constant rate of flow such that at any instant of time the volume of liquid within said length of conduit is less than the cylindrical volume of said length of conduit. Under these conditions, the conduit freely collapses until the effective volume of said length of conduit equals the volume of liquid therein and the liquid pressure $P_1$ within the conduit equals the water pressure $P_2$ on the outside of the conduit. If the pumping pressure is increased to increase the rate of liquid flow through the conduit, the conduit expands toward a cylindrical configuration, the internal and external pressures remaining constantly equalized until the pumping pressure is increased to a point where the volume of liquid within each incremental length of conduit just equals the cylindrical volume of this length of conduit. Up to this point, zero pressure differential exists across the conduit wall 30 and zero hoop tension exists in the wall.

If the pumping pressure is now further increased, the conduit wall stretches, creating a hoop tension in the wall, and the internal conduit pressure becomes greater than the external water pressure on the conduit. This hoop tension, of course, is a function of the difference between the internal and external pressures, and, if the pressure differential is small, the hoop tension is small. The above pressure equalizing action, of course, also occurs with a compressible fluid or gas, except that the latter is in a compressed state during its flow through the conduit.

According to the present invention, the inlet end of conduit 20 is submerged to a predetermined depth and the conduit slopes upwardly at a predetermined gradient in the direction of flow through the conduit, all in such manner that the internal fluid pressure $P_1$ in the conduit and the external water pressure $P_2$ on the conduit are in a predetermined ratio, and a predetermined hoop tension exists in the conduit wall, at each point along the conduit. As will appear from the ensuing description, the conduit gradient may be such as to substantially equalize the internal and external pressures at every point along the conduit. In this case, only minimal hoop tension will exist in the conduit wall. Alternatively, the conduit gradient may be such that the internal pressure exceeds, by a substantial magnitude, the external pressure to establish a ratio of internal to external pressures which is greater than unity and which may remain generally constant or may vary along the conduit. According to the preferred practice of the invention, the gradient of the conduit is such that the external water pressure $P_2$ at each point is just slightly less than the internal pressure $P_1$ at that point in normal operation of the present fluid transmission system, so as to eliminate the possibility of water leakage into the conduit. The hoop tension created in the conduit wall 30 is, therefore, minimal. Under these conditions, the present invention avoids the requirement of a costly pressure vessel construction for the conduit and permits the conduit to be constructed with a thin, flexible membrane wall which serves primarily as a barrier between the fluid being transported and the ambient water to prevent mixing thereof. The above discussion also applies, of course, to the conduit of FIG. 2A in which membrane 36 can react diametrically to equalize internal and external pressures.

The present invention proposes to locate the conduit between the surface and bottom and to tether the conduit to the bottom. This, of course, requires the conduit to possess positive buoyancy. According to the present invention, the fluid pumped is a liquid having a density less than that of the water surrounding the conduit, such as fresh water within a conduit submerged in the ocean. It is significant to note that when the conduit comprises a thin lightweight membrane as just mentioned, the buoyant force resulting from the differing densities of the transported fluid and the surrounding water is sufficient to support the conduit. At this point, such membrane wall of the conduit constantly conforms itself to the liquid stream within the conduit, irrespective of the rate of liquid flow. Thus, if the flow rate increases, the wall expands outwardly and if the flow rate diminishes, the wall contracts inwardly in such a way that the internal volume of the conduit is constantly equal to the volume of the liquid. Accordingly, the interior space of the conduit is completely occupied at all time by liquid. If flow stops completely, the conduit is collapsed flat. Accordingly, there is no possibility of the external sea pressure creating a rupture in or crushing the conduit, as may occur in the case of a rigid walled conduit when the latter is not completely filled with liquid.

Should the fluid being pumped not develop the necessary positive buoyancy force, the conduit must be provided with appropriate flotation means. To this end, the conduit could be shaped, as shown at 20B in FIG. 2B, for example, to provide air chambers 31A at opposite sides of and extending the length of the conduit wall 30A.

In FIGS. 3 and 4, conduit 20 is shown as submerged in the ocean, for example, to a desired depth and anchored to the ocean floor F by an anchorage or tethering system 38. Conduit 20 may, of course, be tethered in other ways, but the illustrated tethering system is ideally suited to the present submarine fluid transmission system. Tethering system 38 comprises two rows 40 of transversely aligned, inverted catenary cables 42 arranged in end-to-end fashion along the course to be followed by the conduit. Cables 42 are anchored at their ends in the ocean floor F by augers 44 or any other suitable anchorages, such as harpoons driven into the floor by rocket thrust and having explosive ejected barbs, or drag anchors. Secured at their lower ends to the cables 42, at intervals along the latter, are vertical riser cables 46. The upper ends of these risers are secured to grommets 48 fixed to the conduit web 28 at intervals therealong. The two rows 40 of inverted catenary cables are arranged so that the included angle between each riser 42 and the vertical is on the order of 30°. The spacing between the rows 40, therefore, varies with the ocean depth to maintain the 30° included angle just mentioned.

It is evident that the conduit 20, being buoyant, tends to bow upwardly between the risers 46, as shown in phantom lines in FIG. 4. This would give the conduit a generally undulated configuration resulting in increased friction losses in the fluid flowing through the conduit.

To minimize or eliminate such undulations in the conduit, the latter is weighted between adjacent riser cables 46 by weighting means whose mass increases to a maximum at a point approximately midway between the adjacent cables where the maximum conduit deflection tends to occur. In the drawings, for example, the conduit chamber 26 is filled with mud M from the ocean floor to weight the conduit between the risers 46. As shown best in FIG. 4, the volume of the chamber 26 varies from a minimum at each riser to a maximum midway between each pair of adjacent risers. In this way, downward forces, which increase to a maximum midwy between adjacent risers, are exerted on the conduit to maintain the latter approximately straight and horizontal between the risers. It is evident that the conduit could be weighted in other ways to achieve the above ends.

The conduit 32 of FIG. 2A can be anchored to the ocean floor or the bottom of another body of water by a cable system like that described above. Conduit 32, being metal and, therefore, relatively rigid, would tend to retain its straight shape without weighting or reinforcing. It will be understood, of course, that the conduit of FIG. 2A would be proportioned to have positive buoyancy either due to the fluid being pumped or to separate flotation means on the conduit.

According to the present invention, a predetermined ratio is established between the external sea pressure $P_2$ on the conduit 20 and the internal fluid pressure $P_1$ in the conduit at each point along the conduit, by anchoring the conduit in such a way that it has an upward slope or gradient in the direction of fluid flow through the conduit, as shown in FIG. 5. In this figure, $S_1$ is a submerged pumping station comprising any conventional pumping means (not shown). The inlet of the pumping station is connected to a supply of the fluid to be pumped through a conduit C. This conduit may be rigid. The conduit 20 of the present submarine fluid transmission system is connected, at its inlet end, to the outlet of the pumping station and extends therefrom to a receiving station $S_2$ with an upward gradient. The inlet end of the conduit receives fluid from the pumping station at a pressure $P_1$. The external sea pressure on the inlet end of the conduit is $P_2$.

In accordance with this invention, the inlet end of the conduit 20 is submerged to a depth such that the inlet pressure $P_1$ to the conduit and the external pressure $P_2$ on the inlet end of the conduit are in a predetermined ratio. The conduit is provided with such an upward gradient that the internal and external pressures are in a predetermined ratio at each point along the conduit. The depth of submergence of the inlet end and the gradient or slope of the conduit may be selected to substantially equalize the internal and external pressures $P_1$, $P_2$ at each point along the conduit. Preferably, however, the internal pressure will slightly exceed the external pressure to prevent leakage of sea water into the conduit in the event a leak develops. In this case, only minimal hoop tension will exist in the conduit wall and the conduit wall may comprise a thin, flexible membrane, as described earlier.

If desired, however, the depth of submergence of the inlet end of the conduit and its upward gradient may be selected to provide substantially less external sea pressure on the conduit than the internal fluid pressure in the conduit. In this case, substantial hoop tension may exist in the conduit wall and the latter must be made sufficiently thick or strong to withstand the hoop tension. The ratio of internal to external pressures may be made to remain generally constant or to vary along the conduit by appropriate selection of the conduit gradient. In the case of a conduit transporting fresh water through the ocean, for example, the conduit must rise 40 feet per mile to maintain a substantial balance of internal and external pressures along the conduit.

The hydrostatic and hydrodynamic principles on which the present submarine fluid transmission system is based will be explained in detail presently. Suffice it to say at this point that the present method of establishing a desired ratio between the internal and external pressures $P_1$, $P_2$ or and a corresponding hoop tension in the conduit may obviously be employed with both conventional rigid conduits and the present flexible conduit 20 with its membrane wall. If the conduit 20 is employed, the conduit will be rendered buoyant by and will collapse to conform to the liquid stream in the conduit as described earlier.

It is evident that the present method of establishing generally constant hoop tension along the conduit is in contrast to and is superior to the methods for this purpose employed on land based conduits, to wit, progressively diminishing the conduit wall thickness and varying the axial spacing of circumferential reinforcements. It is conceivable, of course, that the present invention may also employ a conduit of varying wall thickness.

The submarine fluid transmission system 100 of FIG. 6 is designed for transporting a buoyant fluid, such as fresh water, over relatively great distances through the ocean. This system comprises a number of pumping stations S each including a vertical, rigid walled pump housing 102 having an upper inlet 104 and a lower outlet 106. Extending between the lower outlet of each pump housing and the upper inlet of a following pump housing is a membrane conduit 20 according to the invention. Each conduit is tethered to the ocean floor by anchoring means 108 identical to those described earlier. Within each pump housing 102 is an impeller 110 driven by a motor 112 for pumping fluid through the housing from its inlet 104 to its outlet 106. The several pump inlets are located approximately at the same depth, as are the several pump outlets.

It is apparent that in the system of FIG. 6, external sea pressure reacts on the fluid within the system, through the membrane wall of each conduit 20, and produces on the fluid in each conduit and in the pump housing 102 at the lower end of the conduit an upward buoyant force proportional to the difference in densities of the fluid and sea water. Accordingly, to pump fluid through the system, it is necessary to add to the fluid in each pump housing a pumping head which is at least slightly in excess of this buoyant force on the fluid. This pumping head, then, will discharge fluid from the lower outlet 106 in each pump housing into the inlet end of the adjacent conduit 20. The fluid will then rise through the conduits to the inlets of the following pumping stations.

To understand the operation of the present submarine fluid transmission systems illustrated in FIGURES 5 and 6, consider first the fact that the static pressures or heads in liquid columns of different density diminish at different rates, directly related to the densities, in the upward direction along the columns. Consider, for example the static head changes, over a given vertical distance X, in a liquid of relatively high density $D_H$ and a liquid of relatively low density $D_L$. The static head change in the high density liquid is $XD_H$ and that in the low density liquid is $XD_L$. Since $D_L$ is less than $D_H$, the static head in the column of low density liquid obviously diminishes at a lesser rate, in the upward direction along the column, than the static head in the column of high density liquid. Assume now a sealed tube of length L filled with the liquid of density $D_L$ and submerged in a body of the liquid of density $D_H$ in such a way that the tube slopes upwardly in the direction of one of its ends, the opposite lower end of the tube is located a distance A below the surface of the ambient liquid, and the difference in elevation of the upper and lower ends of the tube is B. Under these conditions, the external static head $P_{2L}$ on the lower end of the tube is $AD_H$ and the internal static head $P_{1L}$ within the lower end of the tube is $BD_L$, which is obviously less than the external head $P_{2L}$. Assume further that an additional head H is applied in some way to the liquid in the tube to make the internal head $P_{1L}$ equal to the external head $P_{2L}$. This applied head is equal to $P_{2L}-P_{1L}$ or $AD_H-BD_L$.

Now consider the internal and external static pressures or heads along the tube. At the lower end of the tube, of course, the internal head $P_{1L}$ and the external head $P_{2L}$ are balanced. At any other level along the tube, however, the internal head exceeds the external head. Thus, assume a level of measurement spaced a vertical distance X above the lower end of the tube. At this level the internal head $P_{1X}$ equals $P_{1L}-XD_L$ and the external head $P_{2X}$ equals $P_{2L}-XD_H$. Since $P_{1L}$ equals $P_{2L}$ and $D_H$ is greater than $D_L$, it is apparent that the internal static pressure or head at any level along the tube is greater than the external head at that level and that the difference between the internal and external heads increases from zero at the lower end of the tube to a maximum of $B(D_H-D_L)$ at the upper end of the tube.

Assume finally a dynamic system wherein the tube referred to above is a rigid walled conduit submerged in a body of water of density $D_H$, the lower end of which conduit is connected to a pump that delivers the liquid of density $D_L$ to the conduit under a total head P necessary to produce the desired rate of flow through the system and is submerged to a depth at which the head P equals the external static head at the lower end of the conduit, and the upper end of which conduit opens to the body of water. Under these conditions liquid flow will occur through the conduit with resultant friction loss in the conduit. It is evident at this point that the total internal head at any elevation along the conduit is equal to the sum of the static and velocity heads at that elevation minus the total friction loss between that elevation and the inlet end of the conduit. At the inlet end of the conduit, of course, the total internal head P equals both the external static head and the sum of the internal velocity and static heads at that end. If we assume a conduit of uniform cross section, it is evident in view of the relationship, stated earlier, between the rates at which the internal and external static heads diminish in the upward direction of liquid flow through the conduit, that at each elevation along the conduit, the sum of the internal static and velocity heads will exceed the external static head and that this head differential increases to a maximum at the upper end of the conduit. In other words, the total internal head at any elevation along the conduit includes, in effect, one component (the sum of the internal static and velocity heads) which exceeds the external static head at that elevation. The difference between this component ond the external head is hereafter referred to as an excess head. The total internal head at any elevation is equal to the excess head at that elevation minus the friction loss up to that elevation.

It is evident that the excess head at any elevation along the conduit is not affected by changing the slope or gradient of the conduit while maintaining a constant flow rate through the conduit and maintaining the upper and lower ends of the conduit at their respective initial elevations. This, of course, requires reducing the conduit length if the gradient is increased and increasing the conduit length if the gradient is reduced. It is further evident that as a consequence of this change in conduit length, the total friction loss along the conduit, and hence the total inlet head required to maintain a constant flow rate, as well as the friction loss between the inlet end of the conduit and any given vertical elevation along the conduit are reduced if the conduit gradient is increased and increased if the conduit gradient is reduced.

It will now be seen that in any given fluid transmission system, a conduit gradient or route exists at which the total internal head and the external head will be substantially balanced along the entire conduit. Under these conditions, only minimal hoop tension will exist in the conduit wall, thus permitting the conduit to comprise a thin membrance, as stated earlier. Reducing the gradient of the conduit will increase the required total inlet head to the conduit, and hence the excess internal head at each elevation along the conduit, by an amount which exceeds the reduction in the excess head occasioned by the increased friction loss between the inlet end of the conduit and the respective elevation. The hoop tension is thus increased in the conduit wall.

The foregoing analysis obviously applies to the fluid transmission systems of FIGURES 5 and 6 wherein the gradient of the conduits 20 is assumed to be that at which the pressures are substantially balanced along the conduits, thus permitting use of thin membrane conduits of the kind described earlier, if desired. In this case, of course, the external water pressure reacts on the liquid within the system (through the membrane walls of the conduits), as in the foregoing analysis wherein it was assumed that the upper end of the conduit opens to the body of ambient liquid. In the system of FIGURES 5 and 6, the total internal head at each elevation along the conduits must be adequate, i.e. equal or exceed the ambient water pressure to prevent collapse of the conduits. If the conduit gradient is less than that which yields balanced pressures, the inlet head to each conduit must be sufficient to assure such adequate internal head at the upper conduit ends, thereby creating hoop tension in at least the lower conduit ends. Obviously, if the conduit in FIGURE 5 is buoyant when filled with the liquid being transported, it would have to be anchored in the manner explained earlier. In the system of FIGURE 6, each pumping station receives liquid from the preceding conduit 20 and adds to the liquid the pumping or velocity head required to establish the proper total internal head at the inlet end of each conduit.

I claim:

1. For use in a submarine fluid transmission system, a fluid conduit open at its ends and adapted to be submerged in a body of water for transporting a fluid through the water,
said conduit having positive buoyancy when filled with said fluid,
said conduit comprising a thin, flexible membrane defining a fluid passage,
said membrane being capable of reacting freely to the fluid pressure in said passage and the external water pressure on the conduit,
anchoring means attached to said conduit at intervals therealong for anchoring the conduit to the bottom of said body of water,
weighting means supported from the underside of said conduit between said anchoring means, and
the mass of said weighting means between each pair of adjacent anchoring means diminishing from a position midway between the respective pair toward each anchoring means of the respective pair.

2. For use in a submarine fluid transmission system, a fluid conduit open at its ends and adapted to be submerged in a body of water for transporting a fluid through the water,
said conduit having positive buoyancy when filled with said fluid,
said conduit comprising a thin, flexible membrane defining a fluid passage and a chamber below said fluid passage extending lengthwise of the conduit,
said membrane being capable of reacting freely to the fluid pressure in said passage and the external water pressure on the conduit,
anchoring means attached to said conduit at intervals therealong for tethering the conduit to the bottom of said body of water, and
said chamber being adapted to receive mud from the bottom of said body of water to weight said conduit between adjacent anchoring means, the volume of said chamber progressively varying between a maximum midway between each pair of adjacent anchoring means and a minimum at said anchoring means, respectively.

3. For use in a submarine fluid transmission system, a fluid conduit open at its ends and adapted to be submerged in a body of water for transporting a fluid through the water,
said conduit having positive buoyancy when filled with said fluid,
said conduit comprising a thin, flexible membrane defining a fluid passage, a chamber below said fluid passage extending lengthwise of said conduit, and a web joining the wall of said passage and the wall of said chamber,
said membrane being capable of reacting freely to the fluid pressure in said passage and the external water pressure on the conduit,
means including cables attached to said web at intervals along said conduit for tethering the latter to the bottom of said body of water, and
said chamber being adapted to receive means for maintaining said conduit straight between said cables.

4. A submarine transmission system for transporting a liquid of given density through a body of water of greater density comprising:
a conduit containing said liquid and extending submerged through said body of water, said conduit having an inlet end and an outlet end,
pumping means at said inlet end for pumping said liquid through said conduit,
at least a longitudinally extending portion of the wall of said conduit comprising a relatively thin, flexible membrane capable of reacting freely to the liquid pressure within said conduit and the external water pressure on said conduit,
said inlet end of said conduit being submerged to a given depth in said water such that the total internal head within said inlet end of said conduit is at least substantially equal to the external water pressure on said inlet end of said conduit, and
means supporting said conduit in said water in such manner that said conduit slopes upwardly toward said outlet end throughout substantially the entire length of said conduit at a gradient such that the sum of the static and velocity heads of said liquid at each elevation along said conduit beyond said inlet end thereof exceeds the external water pressure at the corresponding elevation by an amount at least substantially equal to the total friction loss in said conduit between said inlet end and the respective elevation.

5. A submarine transmission system for transporting a liquid of a given density through a body of water of greater density comprising:
a conduit containing said liquid and extending submerged through said body of water said conduit having an inlet end and an outlet end,
pumping means at said inlet end for pumping said liquid through said conduit,
substantially the entire wall of said conduit comprising a relatively thin, flexible membrane capable of reacting freely to the liquid pressure within said conduit and the external water pressure on said conduit,
said inlet end of said conduit being submerged to a given depth in said water such that the total internal head within said inlet end of said conduit is at least substantially equal to the external water pressure on said inlet end of said conduit, and
means supporting said conduit in said water in such manner that said conduit slopes upwardly toward said outlet end throughout substantially the entire length of said conduit at a gradient such that the sum of the static and velocity heads of said liquid at each elevation along said conduit beyond said inlet end thereof exceeds the external water pressure at the corresponding elevation by an amount at least substantially equal to the total friction loss in said conduit between said inlet end and the respective elevation.

6. A submarine transmission system for transporting through a body of water a liquid having a density less than the density of said water, comprising:
a plurality of spaced pumping units submerged to a generally uniform depth in said water and each including a rigid, pump housing having an upper inlet and a lower outlet, and pumping means within said housing for pumping said liquid through said housing from said inlet to said outlet,
a conduit extending submerged through said body of water from said outlet of each pumping unit to said inlet of the next pumping unit,
at least a longitudinally extending portion of the wall of each said conduit comprising a relatively thin, flexible membrane capable of reacting freely to the internal liquid pressure within said conduit and the external water pressure on said conduit, said outlet of each said pumping unit being submerged to a given depth in said water such that the total internal head at said outlet of each pumping unit is at least substantially equal to the external water pressure at the respective outlet, and means anchoring each said pumping unit and conduit to the floor of said body of water in such manner that each conduit slopes upwardly from the outlet to said inlet of its respective adjacent pumping units throughout substantially the entire length of the respective conduit at a gradient such that the sum of the static and velocity heads of said liquid at each elevation along the respective conduit beyond the lower end thereof exceeds the external water pressure at the corresponding elevation by an amount at least substantially equal to the total friction loss in the respective conduit between said lower end thereof and the respective elevation.

7. A submarine transmission system for transporting through a body of water a liquid having a density less than the density of said water, comprising:

a plurality of spaced pumping units submerged to a generally uniform depth in said water and each including a rigid, pump housing having an upper inlet and a lower outlet, and pumping means within said housing for pumping said liquid through said housing from said inlet to said outlet, a conduit extending submerged through said body of water from said outlet of each pumping unit to said inlet of the next pumping unit, substantially the entire wall portion of each said conduit comprising a relatively thin, flexible membrane capable of reacting freely to the internal liquid pressure within said conduit and the external water pressure on said conduit, said outlet of each said pumping unit being submerged to a given depth in said water such that the total internal head at said outlet of each pumping unit is at least substantially equal to the external water pressure at the respective outlet, and means anchoring each said pumping unit and conduit to the floor of said body of water in such manner that each conduit slopes upwardly from the outlet to said inlet of its respective adjacent pumping units at a generally uniform angle to the horizontal throughout substantially the entire length of the respective conduit at a gradient such that the sum of the static and velocity heads of said liquid at each elevation along the respective conduit beyond the lower end thereof exceeds the external water pressure at the corresponding elevation by an amount at least substantially equal to the total friction loss in the respective conduit between said lower end thereof and the respective elevation.

References Cited

UNITED STATES PATENTS

| | | | |
|---|---|---|---|
| 745,351 | 12/1903 | Hungerford | 137—236 |
| 2,731,168 | 1/1956 | Watts | 137—236 X |
| 2,776,169 | 1/1957 | Aschenbrenner | 137—236 X |
| 2,923,954 | 2/1960 | Babcock | 138—118 X |
| 3,021,864 | 2/1962 | Young | 137—236 |
| 3,216,203 | 11/1965 | Giraud | 61—72.3 |

FOREIGN PATENTS

| | | |
|---|---|---|
| 1,271,062 | 7/1961 | France. |
| 647,226 | 12/1950 | Great Britain. |
| 811,301 | 4/1959 | Great Britain. |

HAROLD W. WEAKLEY, Primary Examiner.

U.S. Cl. X.R.

61—72.3; 137—236, 566; 138—118